(12) United States Patent
Yamagata et al.

(10) Patent No.: US 12,139,101 B2
(45) Date of Patent: Nov. 12, 2024

(54) VEHICLE EMERGENCY RESCUE REQUEST SYSTEM

(71) Applicant: SUBARU CORPORATION, Tokyo (JP)

(72) Inventors: Satoshi Yamagata, Tokyo (JP); Takeshi Yamaura, Tokyo (JP); Koutarou Saitou, Tokyo (JP); Shouta Suzawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 218 days.

(21) Appl. No.: 18/061,682

(22) Filed: Dec. 5, 2022

(65) Prior Publication Data

US 2023/0234536 A1    Jul. 27, 2023

(30) Foreign Application Priority Data

Jan. 24, 2022  (JP) ................................ 2022-009016

(51) Int. Cl.
*B60R 25/24* (2013.01)
*B60R 25/25* (2013.01)
(Continued)

(52) U.S. Cl.
CPC ............ *B60R 25/24* (2013.01); *B60R 25/252* (2013.01); *G06V 40/12* (2022.01); *H04N 5/77* (2013.01); *H04W 4/90* (2018.02)

(58) Field of Classification Search
CPC ..... B60R 25/24; B60R 25/252; B60R 25/102; B60R 25/31; B60R 2325/205;
(Continued)

(56) References Cited

U.S. PATENT DOCUMENTS

| 10,899,359 B2 * | 1/2021 | Kim ................. B60W 50/0098 |
| 2013/0194089 A1 * | 8/2013 | Estrada ................ B60N 2/28 340/584 |

(Continued)

FOREIGN PATENT DOCUMENTS

| JP | 2011-141581 A | 7/2011 |
| JP | 2019-144640 A | 8/2019 |

*Primary Examiner* — Nam V Nguyen
(74) *Attorney, Agent, or Firm* — Rimon P.C.

(57) ABSTRACT

A vehicle emergency rescue request system includes a rescue request process apparatus and an in-vehicle apparatus. The rescue request process apparatus includes a surrounding-region terminal search unit, a rescue request transmission unit, a first request-addressee information acquisition unit, and a digital key providing unit. The surrounding-region terminal search unit searches for a terminal in a surrounding region. The rescue request transmission unit transmits a rescue request to the terminal. The first request-addressee information acquisition unit acquires, from the terminal, information identifying a request addressee who has the terminal on and accepts the rescue request. The digital key providing unit gives a door-unlock authority to the terminal after the information is acquired. The in-vehicle apparatus includes at least one processor and at least one memory. The processor acquires biometric information regarding the request addressee if the request addressee uses the door-unlock authority and unlocks a door of the vehicle.

5 Claims, 5 Drawing Sheets

(51) Int. Cl.
*G06V 40/12* (2022.01)
*H04N 5/77* (2006.01)
*H04W 4/90* (2018.01)

(58) Field of Classification Search
CPC ....... B60R 25/25; B60R 25/305; B60R 25/33; G06V 40/12; G06V 20/593; H04N 5/77; H04N 7/188; H04W 4/90; H04W 4/021; H04W 12/06; H04W 12/08; H04W 12/126; H04W 4/40; H04W 12/63; H04W 12/65; H04L 63/0861
USPC .......................................... 340/5.53, 5.7, 6.1
See application file for complete search history.

(56) References Cited

U.S. PATENT DOCUMENTS

| | | | |
|---|---|---|---|
| 2020/0062080 A1* | 2/2020 | Hernandez | B60H 1/00742 |
| 2020/0126385 A1* | 4/2020 | Yoshida | G08B 21/02 |
| 2022/0116863 A1* | 4/2022 | Nakagawa | H04W 48/18 |
| 2022/0188952 A1* | 6/2022 | Nakashima | G08G 1/202 |
| 2023/0086328 A1* | 3/2023 | Kaneta | H04W 4/90 |
| | | | 455/404.2 |

* cited by examiner

VEHICLE EMERGENCY RESCUE REQUEST SYSTEM

CROSS-REFERENCE TO RELATED APPLICATIONS

The present application claims priority from Japanese Patent Application No. 2022-009016 filed on Jan. 24, 2022, the entire contents of which are hereby incorporated by reference.

BACKGROUND

The disclosure relates to a vehicle emergency rescue request system.

Recently, leaving, for example, an infant inside a vehicle in the hot sun has been a social issue.

To address such a case, disclosed is a system for notification of in-vehicle abnormal conditions. In a case where an abnormal condition occurs in a parked vehicle, for example, in a case where an infant or the like is left inside the vehicle, the system for notification of in-vehicle abnormal conditions automatically acquires notification destination information for communicating with a host machine of a facility or a store which manages a parking lot, and is thereby able to automatically notify the host machine of the facility or the store designated by the notification destination information of the occurrence of the abnormal conditions. For example, reference is made to Japanese Unexamined Patent Application Publication (JP-A) No. 2011-141581.

In a case where occurrence of an abnormal condition is found inside a vehicle and the occurrence of the abnormal condition is uniformly reported to an outside institution such as a medical institution or the police, notification or a control can be excessive. To address this, disclosed is an occupant relief system that is able to suppress an excessive control while enhancing an operation of protecting a person left inside the vehicle. For example, reference is made to Japanese Unexamined Patent Application Publication (JP-A) No. 2019-144640.

SUMMARY

An aspect of the disclosure provides a vehicle emergency rescue request system configured to make a rescue request to an outside of a vehicle in a case where an occupant of the vehicle is in a dangerous state. The vehicle emergency rescue request system includes a rescue request process apparatus and an in-vehicle apparatus. The rescue request process apparatus includes a surrounding-region terminal search unit, a rescue request transmission unit, a first request-addressee information acquisition unit, and a digital key providing unit. The surrounding-region terminal search unit is configured to search for a terminal that is present in a surrounding region of the vehicle. The rescue request transmission unit is configured to transmit a rescue request to the terminal. The first request-addressee information acquisition unit is configured to acquire information from the terminal. The information identifies a request addressee who has the terminal on and accepts the rescue request. The digital key providing unit is configured to give a door-unlock authority to the terminal of the request addressee after the first request-addressee information acquisition unit acquires the information. The in-vehicle apparatus includes one or more processors and one or more memories. The one or more memories are configured to be communicably coupled to the one or more processors. The one or more processors are configured to acquire biometric information regarding the request addressee in a case where the request addressee uses the door-unlock authority and unlocks a door of the vehicle.

An aspect of the disclosure provides a vehicle emergency rescue request system configured to make a rescue request to an outside of a vehicle in a case where an occupant of the vehicle is in a dangerous state. The vehicle emergency rescue request system includes a rescue request process apparatus and an in-vehicle apparatus. The rescue request process apparatus includes circuitry. The circuitry is configured to search for a terminal that is present in a surrounding region of the vehicle. The circuitry is configured to transmit a rescue request to the terminal. The circuitry is configured to acquire information from the terminal. The information identifies a request addressee who has the terminal on and accepts the rescue request. The circuitry is configured to give a door-unlock authority to the terminal of the request addressee after acquiring the information. The in-vehicle apparatus includes one or more processors and one or more memories. The one or more memories are configured to be communicably coupled to the one or more processors. The one or more processors are configured to acquire biometric information regarding the request addressee in a case where the request addressee uses the door-unlock authority and unlocks a door of the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
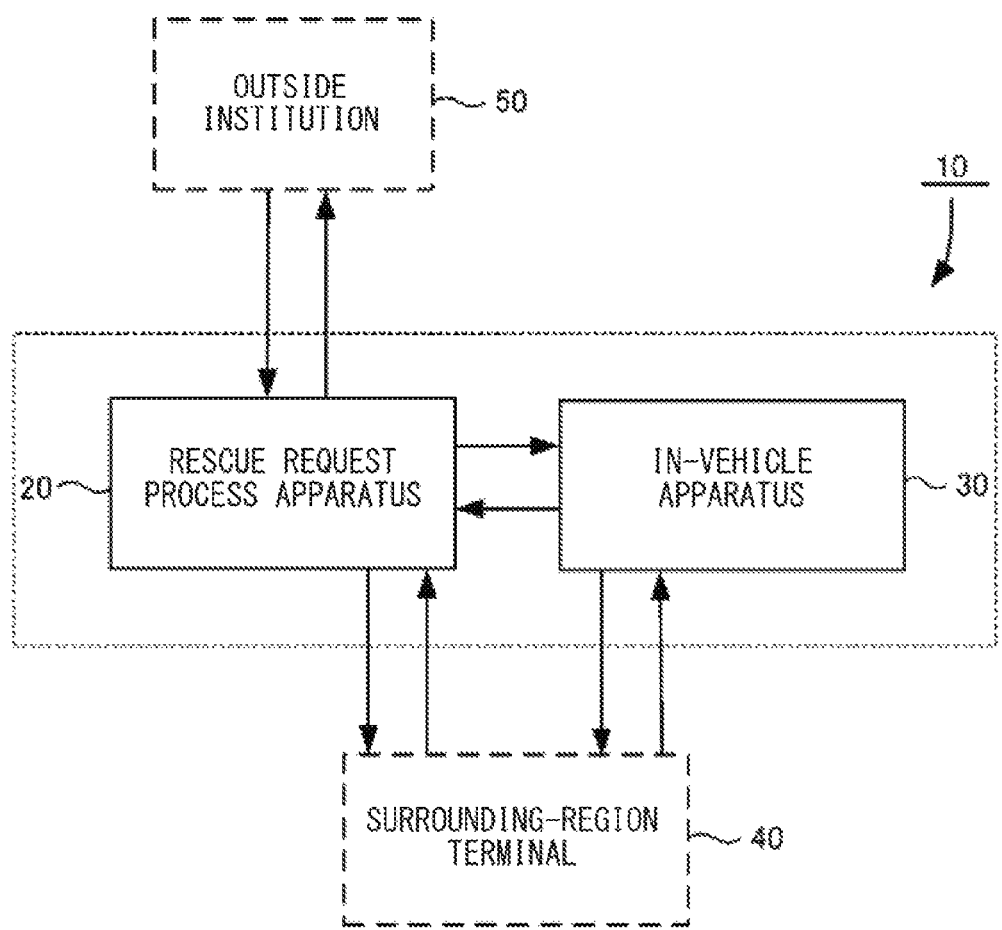
FIG. 1 is a system configuration diagram illustrating a vehicle emergency rescue request system according to one example embodiment of the disclosure.

With techniques disclosed in JP-A Nos. 2011-141581 and 2019-144640, even if a system reports an emergency, for example, an owner of a vehicle may not recognize that the emergency is reported.

In addition, depending on the place where the emergency occurs, for example, the owner of the vehicle for which a rescue request is made may not be present in a surrounding region of the vehicle. In such a case, it may take considerable time for a rescuer to arrive, which leads to a delay in rescuing an infant or the like that is left inside the vehicle.

In addition, a digital key system is known that uses a mobile terminal such as a smartphone as a vehicle key. For example, such a digital key system is able to provide a digital key to a mobile terminal owned by a third party via the Internet. However, this may have a security issue.

It is desirable to provide a vehicle emergency rescue request system that makes a rescue request to a third party that is present in a surrounding region of a vehicle to be rescued and achieve a swift rescue while securing security.

Example Embodiments

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Referring to FIGS. 1 to 5, a description is given of a vehicle emergency rescue request system 10 according to an example embodiment of the disclosure.

Configuration of Vehicle Emergency Rescue Request System 10

As illustrated in FIG. 1, the vehicle emergency rescue request system 10 according to the example embodiment includes a rescue request process apparatus 20 and an in-vehicle apparatus 30.

In a case where an occupant of a vehicle is in a dangerous state, the rescue request process apparatus 20 may search for a terminal that is present in a surrounding region of the vehicle and make a rescue request.

In addition, the rescue request process apparatus 20 may acquire personal information regarding a request addressee that accepts the rescue request and may transmit position information regarding the vehicle.

In a case where the request addressee reaches a location that is near a position of the vehicle and is at a predetermined distance to the position of the vehicle, the rescue request process apparatus 20 may give a door-unlock authority to a terminal of the request addressee and determine whether a rescue is completed. The door-unlock authority may be an authority to unlock a door of the vehicle.

Details of the rescue request process apparatus 20 will be described later.

The in-vehicle apparatus 30 may be mounted in the vehicle. The in-vehicle apparatus 30 may collect information regarding presence or absence of a person left inside the vehicle.

For example, the in-vehicle apparatus 30 may acquire biometric information regarding the request addressee.

In addition, the in-vehicle apparatus 30 may record image information during a rescue operation. In a case where the in-vehicle apparatus 30 determines that the rescue is completed on the basis of the recorded image information, the in-vehicle apparatus 30 may lock the door of the vehicle.

Details of the in-vehicle apparatus 30 will be described later.

Configuration of Rescue Request Process Apparatus 20

Figure 2:
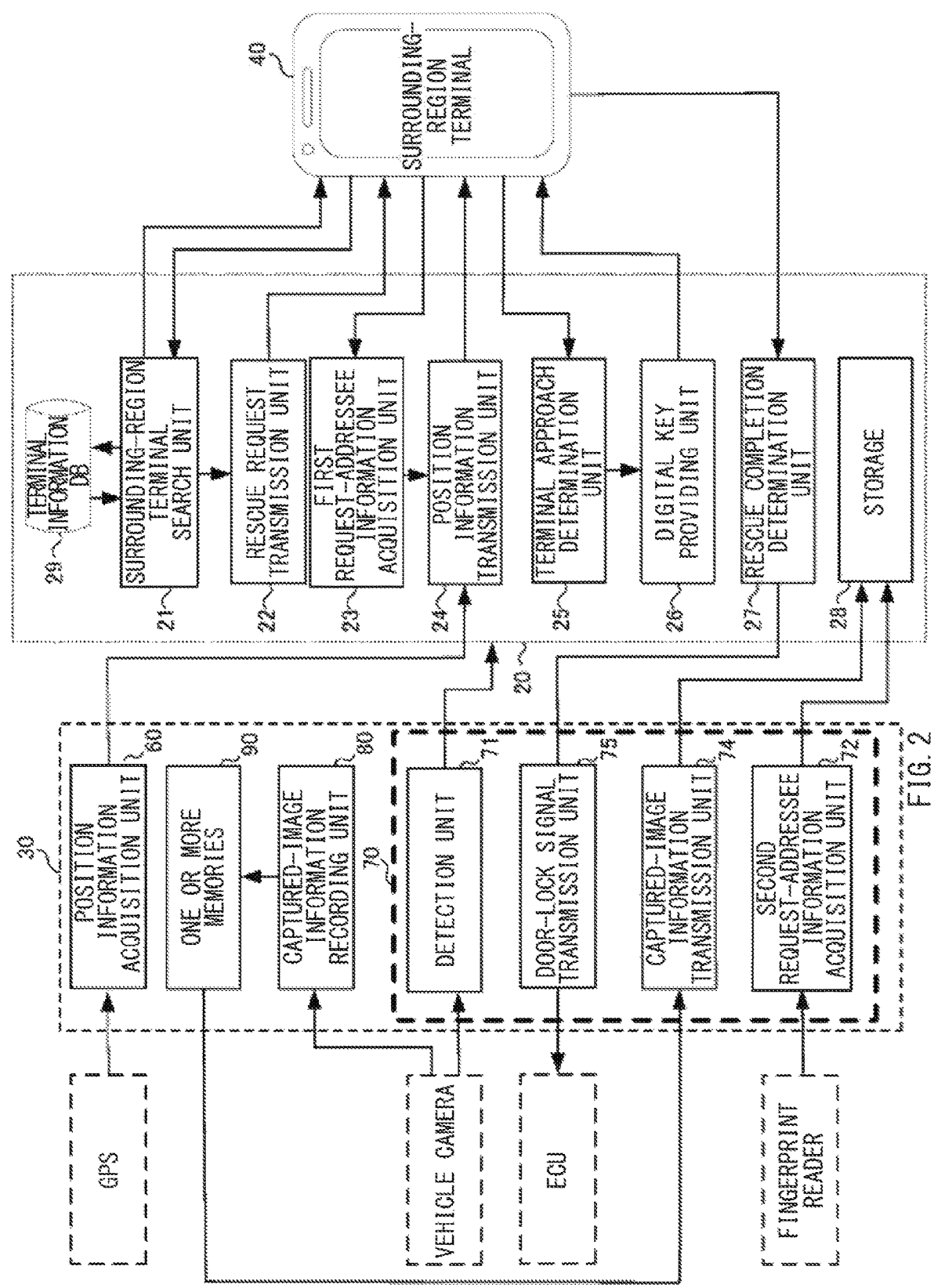
FIG. 2 is a system configuration diagram regarding a rescue according to one example embodiment of the disclosure.

As illustrated in FIG. 2, the rescue request process apparatus 20 may include a surrounding-region terminal search unit 21, a rescue request transmission unit 22, a first request-addressee information acquisition unit 23, a position information transmission unit 24, a terminal approach determination unit 25, a digital key providing unit 26, a rescue completion determination unit 27, a storage 28, and a terminal information database 29.

The surrounding-region terminal search unit 21 searches for a terminal that is present in the surrounding region of the vehicle, i.e., a surrounding-region terminal 40.

For example, on the basis of information regarding particular members of the same insurance company or information regarding users of the same mobile phone service company, the surrounding-region terminal search unit 21 may search for mobile terminals of third parties in order of smallness in distance from the vehicle to be rescued. Upon searching for such mobile terminals, the surrounding-region terminal search unit 21 may use position information obtained, for example, by a global positioning system (GPS), a Bluetooth low energy (BLE) communication, or an ultra-wide band (UWB) communication.

The rescue request transmission unit 22 makes a rescue request to the searched surrounding-region terminal 40. The rescue request transmission unit 22 may make the rescue request to the searched surrounding-region terminal 40, for example, by means of a mobile terminal short message service or a special application.

For example, the rescue request transmission unit 22 may make the rescue request to a plurality of surrounding-region terminals 40 in order of smallness in distance from the vehicle.

The first request-addressee information acquisition unit 23 acquires information identifying the request addressee from the surrounding-region terminal 40 of the request addressee that accepts the rescue request.

Examples of the information identifying the request addressee may include information registered in the surrounding-region terminal 40 owned by the request addressee, regarding a mobile phone number, ID information, a name, a birth date, and an address.

The position information transmission unit 24 may acquire, from a position information acquisition unit 60 to be described later, position information regarding the vehicle to be rescued based on GPS position information. The position information transmission unit 24 may add a uniform resource locator (URL) of map information to a mobile terminal short message and transmit the mobile terminal short message to the surrounding-region terminal 40.

Note that in addition to attaching the URL of the map information to the mobile terminal short message, for example, the URL of the map information may be automatically displayed together with a message on an application.

The terminal approach determination unit 25 may determine whether the request addressee has reached the location that is near the position of the vehicle and is at the predetermined distance to the position of the vehicle.

The terminal approach determination unit 25 may use, for example, the GPS position information regarding the surrounding-region terminal 40 owned by the request addressee and thereby determine whether the surrounding-region terminal 40 owned by the request addressee has reached the location that is near the position of the vehicle to be rescued and is at the predetermined distance to the position of the vehicle.

The predetermined distance may be, for example, a distance that allows a terminal of the request addressee or the request addressee himself or herself to immediately perform a rescue.

For example, upon transmitting the position information regarding the vehicle to be rescued, the terminal approach determination unit 25 may transmit temporary key information to the surrounding-region terminal 40 owned by the request addressee. The terminal approach determination unit 25 may determine that the surrounding-region terminal 40 owned by the request addressee has reached the location that is near the position of the vehicle to be rescued and is at the predetermined distance to the position of the vehicle on the basis of detection, by the vehicle to be rescued, of the temporary key information from the surrounding-region terminal 40 owned by the request addressee.

After the first request-addressee information acquisition unit 23 completes information acquisition, in a case where the surrounding-region terminal 40 owned by the request addressee has reached the location that is near the position of the vehicle to be rescued and is at the predetermined distance to the position of the vehicle, the digital key providing unit 26 may give the door-unlock authority to the surrounding-region terminal 40 owned by the request addressee.

For example, the digital key providing unit 26 may provide a digital key as digital information to the surrounding-region terminal 40 owned by the request addressee.

The rescue completion determination unit 27 may determine whether the rescue is completed on the basis of the image information during the rescue operation.

In a case where the rescue completion determination unit 27 determines that the rescue is completed, the rescue completion determination unit 27 may transmit, for example, a signal to lock the door of the vehicle to an electronic control unit (ECU) of the vehicle and thereby lock the door of the vehicle.

The rescue completion determination unit 27 may use, for example, the following method to determine whether the rescue is completed. For example, the rescue completion determination unit 27 may determine that the rescue is completed in a case where the request addressee performing the rescue or a rescue target left inside the vehicle is no longer included in the image during the rescue operation captured by a device such as a vehicle camera provided in the vehicle.

Alternatively, the rescue completion determination unit 27 may determine that the rescue is completed on the basis of a completion report from the request addressee.

The storage 28 may hold, for example, the image information during the rescue operation, the biometric information such as fingerprint information regarding the request addressee, or any other information.

The storage 28 may include, for example, a hard disc drive (HDD) or a solid state drive (SSD) provided on a server.

The terminal information database 29 may include a database that stores third-party terminal information. The third-party terminal information may be searched in a case where the surrounding-region terminal search unit 21 searches for a mobile terminal owned by a third party as a candidate to transmit a rescue request.

For example, the terminal information database 29 may include a database that stores the information regarding particular members of the same insurance company or the information regarding users of the same mobile phone service company.

In addition, the terminal information database 29 may include, for example, the following: a database that stores terminal information regarding members that are registered to a community group based on an idea that the members are to rescue each other in a case where an occupant of a vehicle to be rescued is in a dangerous state; a database that stores terminal information regarding people registered upon buying vehicles; or a database that stores public personal information.

In one example, the owner of the vehicle to be rescued may decide in advance the terminal information database to be searched.

The terminal information database 29 may store terminal information for making a highly urgent rescue request in a case where an occupant inside the vehicle to be rescued is in a dangerous state. Therefore, the terminal information database 29 may include not only a single terminal information database but may include a plurality of terminal information databases to expand, in quantity, the information to be searched.

Configuration of In-vehicle Apparatus 30

As illustrated in FIG. 2, the in-vehicle apparatus 30 may include one or more processors 70, one or more memories 90, the position information acquisition unit 60, and a captured-image information recording unit 80. The one or more memories 90 are communicably coupled to the one or more processors 70.

The one or more processors 70 may perform a general control of the in-vehicle apparatus 30 as a whole in accordance with a control program stored in the one or more memories 90 to be described later.

In the example embodiment, the one or more processors 70 may perform, for example, respective operations of units including a detection unit 71, a second request-addressee information acquisition unit 72, a captured-image information transmission unit 74, and a door-lock signal transmission unit 75.

The one or more memories 90 may include, for example, a read-only memory (ROM) and a random-access memory (RAM). The ROM may hold, for example, the control program described above. The RAM may hold, for example, various kinds of data.

The position information acquisition unit 60 may detect own-vehicle position information from a GPS receiver and transmit the own-vehicle position information to the position information transmission unit 24 of the rescue request process apparatus 20.

For example, the captured-image information recording unit 80 may record, in the one or more memories 90, the image information during the rescue operation from a start timing to an end timing of the rescue. The image information during the rescue operation may be captured, for example, by a device such as an in-vehicle camera.

For example, the captured-image information recording unit 80 may record the image during the rescue operation from the start timing to the end timing of the rescue, for example, in the ROM or the RAM.

Configuration of One or More Processors 70

As illustrated in FIG. 2, the one or more processors 70 may include the detection unit 71, the second request-addressee information acquisition unit 72, the captured-image information transmission unit 74, and the door-lock signal transmission unit 75.

The detection unit 71 may detect presence or absence of a person who is left inside the vehicle.

For example, in a case where, although an engine is stopped, an infant is determined as being left alone inside the vehicle on the basis of the image information captured by the device such as the vehicle camera mounted in the vehicle, the detection unit 71 may detect that the infant is left inside the vehicle.

The second request-addressee information acquisition unit 72 may acquire the biometric information regarding the request addressee.

For example, when the request addressee touches a door handle to open the door, the second request-addressee information acquisition unit 72 may acquire the fingerprint information as the biometric information regarding the request addressee from a fingerprint reader provided to the door handle.

The captured-image information transmission unit 74 may transmit the image information during the rescue operation stored in the one or more memories 90, for example, to the storage 28 via a network. The storage 28 may include, for example, the HDD or the SSD on the server.

In a case where the rescue is determined as being completed, the door-lock signal transmission unit 75 may transmit, for example, a signal to lock the door of the vehicle to the ECU of the vehicle.

Process to Be Performed by Vehicle Emergency Rescue Request System 10

Figure 3:
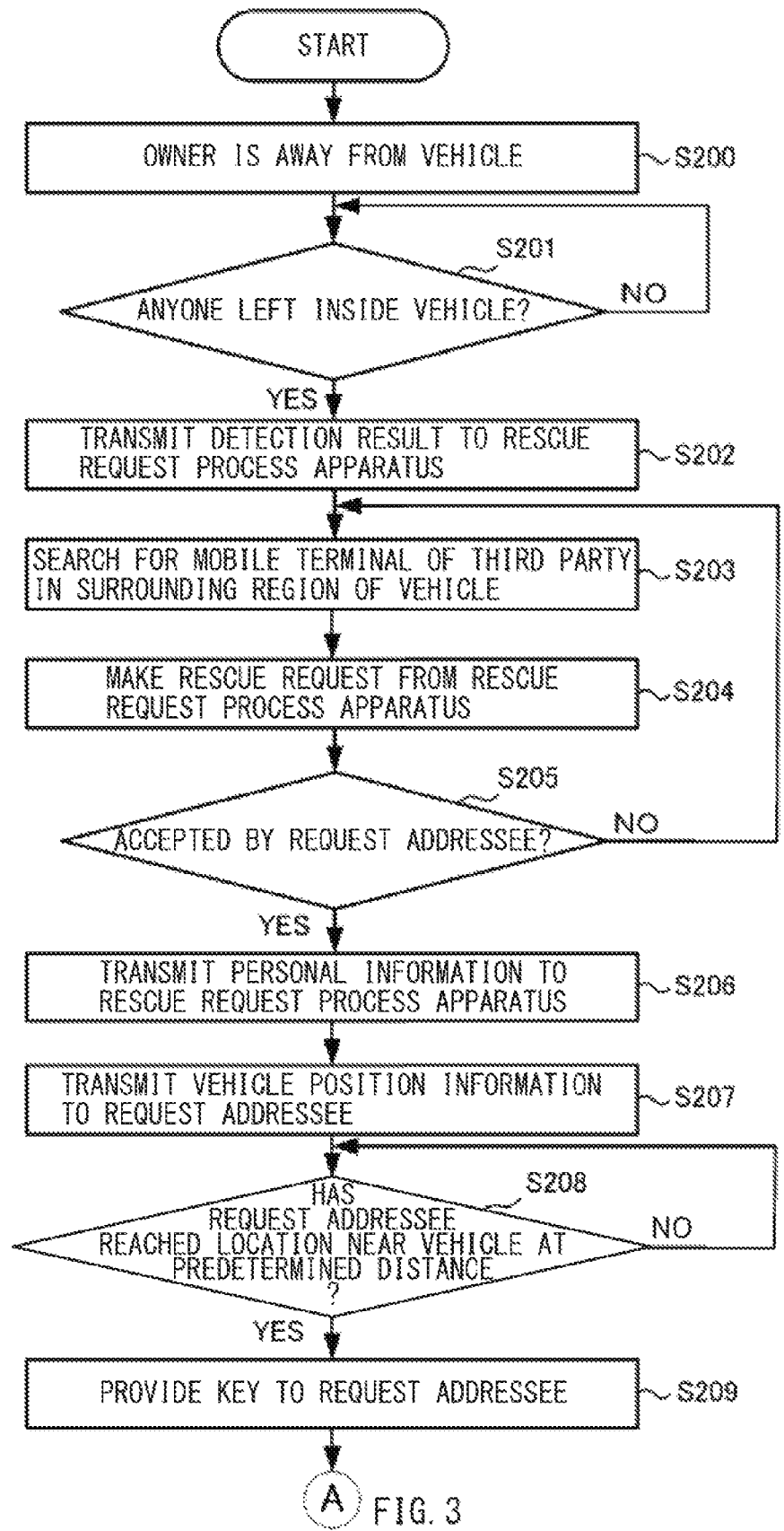
FIG. 3 is a flowchart illustrating a flow according to one example embodiment of the disclosure.
Figure 4:
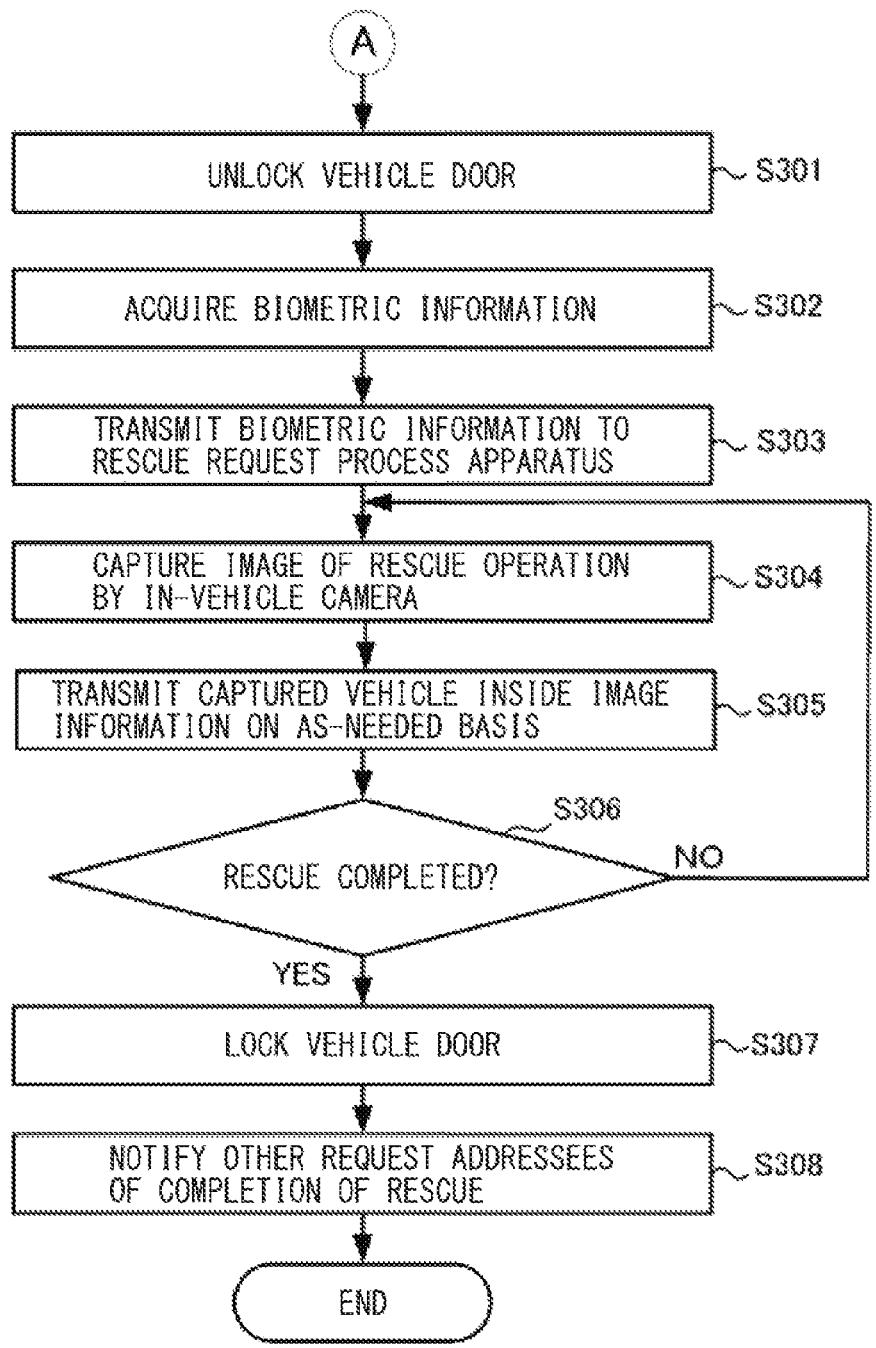
FIG. 4 is a flowchart illustrating a flow according to one example embodiment of the disclosure.
Figure 5:
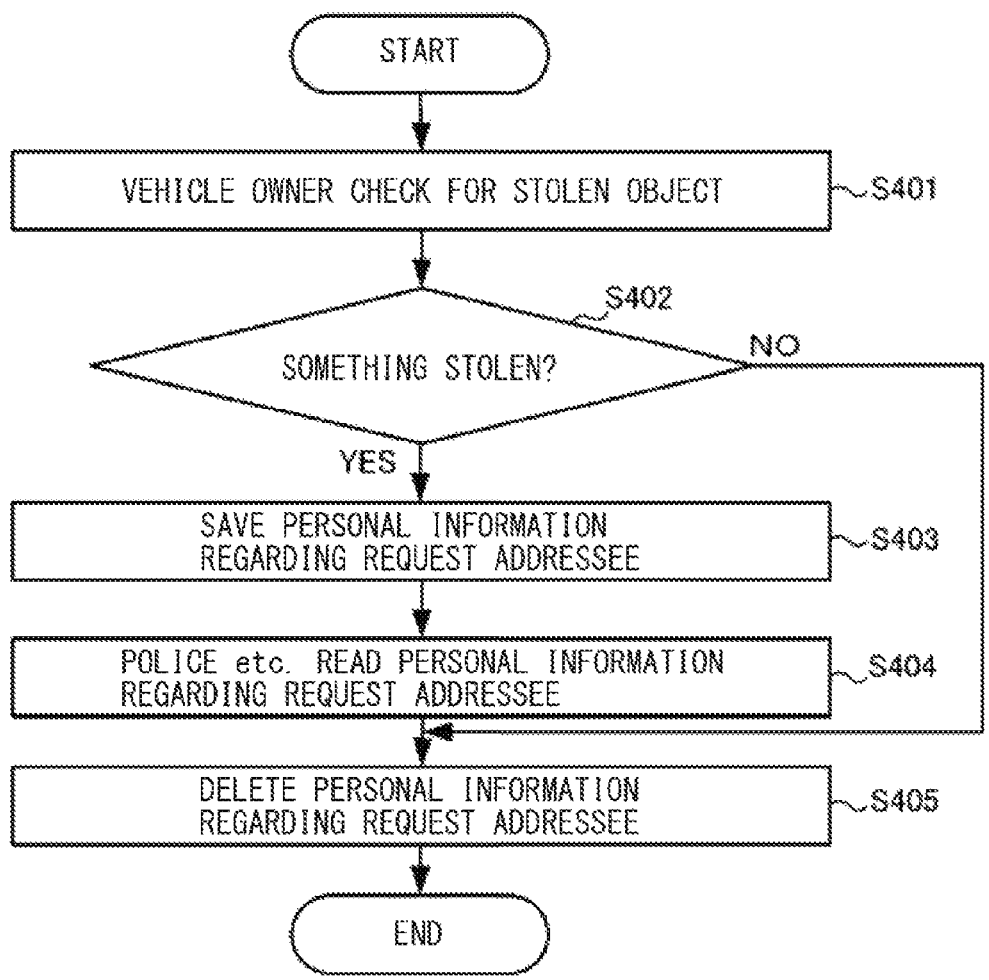
FIG. 5 is a flowchart illustrating a flow for handling personal information after a rescue according to one example embodiment of the disclosure.

Referring to FIGS. 3 to 5, a description is given of a process to be performed by the vehicle emergency rescue request system 10 according to the example embodiment.

Process up to Rescue

As described in FIG. 3, in a case where the owner of the vehicle to be rescued is detected as being away from the vehicle, for example, on the basis of the image information captured by a device such as the vehicle camera mounted in the vehicle to be rescued (step S200), for example, the detection unit 71 may detect whether any person is left inside the vehicle on the basis of the image information obtained by a device such as the vehicle camera mounted in the vehicle to be rescued (step S201). If the detection unit 71 detects that a person is left inside the vehicle (step S201: YES), the detection unit 71 may transmit a detection result to the rescue request process apparatus 20 (step S202).

If the detection unit 71 does not detect any person left inside the vehicle (step S201: NO), the detection unit 71 may determine that the rescue of the person left inside the vehicle is competed. Thereafter, the process may return to step S201 and the detection unit 71 may be in a standby state.

For example, the surrounding-region terminal search unit 21 of the rescue request process apparatus 20 that has received the detection result may identify the position information regarding the surrounding-region terminal 40 owned by a third party and search for the surrounding-region terminals 40 of third parties in order of smallness in distance from the vehicle to be rescued by means of a position information system of the GPS, on the basis of the third-party terminal information stored in the terminal information database 29 (step S203).

The rescue request transmission unit 22 of the rescue request process apparatus 20 may make a rescue request regarding the person left inside the vehicle to the surrounding-region terminal 40 owned by the third party searched in step S203 (step S204).

If the surrounding-region terminal 40 receives an input indicating that the third party who has received the rescue request, i.e., the request addressee, accepts the rescue request (step S205: YES), the surrounding-region terminal 40 may transmit an acceptance notification and personal information registered in the surrounding-region terminal 40 owned by the request addressee to the first request-addressee information acquisition unit 23 of the rescue request process apparatus 20 (step S206). The personal information to be transmitted may include, for example, an address.

Note that upon making the rescue request in step S204, the rescue request process apparatus 20 may ask the request addressee to agree with the transmission of the personal information regarding the request addressee to the rescue request process apparatus 20 and the acceptance of the rescue request.

If the surrounding-region terminal 40 does not receive an input indicating that the third party who has received the rescue request, i.e., the request addressee, accepts the rescue request (step S205: NO), the surrounding-region terminal search unit 21 of the rescue request process apparatus 20 may newly search for the surrounding-region terminal 40 owned by another third party that is present in the surrounding region of the vehicle (step S203).

The position information transmission unit 24 of the rescue request process apparatus 20 may receive the position information regarding the vehicle to be rescued from the position information acquisition unit 60 of the in-vehicle apparatus 30, and may transmit the position information regarding the vehicle to be rescued to the surrounding-region terminal 40 owned by the request addressee that accepts the rescue request (step S207).

In a case where the request addressee approaches the vehicle to be rescued on the basis of the position information regarding the vehicle, the terminal approach determination unit 25 of the rescue request process apparatus 20 may determine whether the surrounding-region terminal 40 owned by the request addressee has reached the location that is near the position of the vehicle to be rescued and is at the predetermined distance to the position of the vehicle, for example, by using the GPS position information (step S208).

If the terminal approach determination unit 25 of the rescue request process apparatus 20 determines that the surrounding-region terminal 40 owned by the request addressee has reached the location that is near the position of the vehicle to be rescued and is at the predetermined distance to the position of the vehicle (step S208: YES), the digital key providing unit 26 of the rescue request process apparatus 20 may provide a digital key to the vehicle to be rescued to the surrounding-region terminal 40 owned by the request addressee (step S209). If the terminal approach determination unit 25 of the rescue request process apparatus 20 determines that the surrounding-region terminal 40 owned by the request addressee has not yet reached the location that is near the position of the vehicle to be rescued and is at the predetermined distance to the position of the vehicle (step S208: NO), the process may return to step S208 and the terminal approach determination unit 25 may be in a standby state.

As described in FIG. 4, the door of the vehicle may be unlocked by the digital key given to the request addressee (step S301). When the request addressee touches the door handle to open the door, for example, the second request-addressee information acquisition unit 72 of the in-vehicle apparatus 30 may acquire the biometric information such as the fingerprint information regarding the request addressee from a device such as the fingerprint reader provided to the door handle (step S302).

Thereafter, the second request-addressee information acquisition unit 72 of the in-vehicle apparatus 30 may transmit the acquired biometric information to the storage 28 (step S303).

When the request addressee opens the door and starts a rescue operation, for example, the captured-image information recording unit 80 may capture an image of the rescue operation by a device such as the camera mounted in the vehicle (step S304), and record the obtained image information in the one or more memories 90.

The captured-image information transmission unit 74 may transmit the obtained image information to the storage 28 on an as-needed basis (step S305).

On the basis of the image information during the rescue operation, the rescue completion determination unit 27 of the rescue request process apparatus 20 may determine whether the request addressee has completed the rescue of the person left inside the vehicle (step S306).

If the rescue completion determination unit 27 determines that the rescue is completed (step S306: YES), for example, the door-lock signal transmission unit 75 may transmit a signal for locking the door of the vehicle to the ECU of the vehicle to be rescued and thereby lock the door of the vehicle (step S307).

On this occasion, if a rescue request has been made to another third party, the rescue request process apparatus 20 may notify the surrounding-region terminal 40 owned by the other third party of the completion of the rescue (step S308).

If the rescue completion determination unit 27 of the rescue request process apparatus 20 determines that the rescue is not completed yet (step S306: NO), the captured-image information recording unit 80 may continue to capture the image of the rescue operation performed by the request addressee (step S304).

Process after Completion of Rescue

Now, referring to FIG. 5, a description is given of a flow after the rescue is completed.

The owner of the vehicle to be rescued may check whether anything has been stolen from the vehicle during the rescue operation (step S401).

As a result of the checking performed by the owner of the vehicle to be rescued, if there is something stolen (step S402: YES), the personal information regarding the request addressee that has been transmitted to the storage 28 of the rescue request process apparatus 20 upon the rescue operation may be saved (step S403).

For example, the personal information saved in the storage 28 may be accessed by the police (step S404) to be used in investigation of the stolen object.

Alternatively, for example, the personal information stored in the storage 28 may be transmitted to and saved by an outside institution 50, such as an insurance company located at another place, to be used to find the stolen object.

In contrast, as a result of the checking performed by the owner of the vehicle to be rescued, if there is nothing stolen (step S402: NO), the rescue request process apparatus 20 may delete the personal information regarding the request addressee transmitted to the storage 28 (step S405). Alternatively, for example, the rescue request process apparatus 20 may delete the personal information regarding the request addressee transmitted to the storage 28 (step S405) at a timing when the investigation is ended.

Example Workings and Effects

As described above, the vehicle emergency rescue request system 10 according to the example embodiment includes the rescue request process apparatus 20 and the in-vehicle apparatus 30. The rescue request process apparatus 20 includes the surrounding-region terminal search unit 21, the rescue request transmission unit 22, the first request-addressee information acquisition unit 23, and the digital key providing unit 26. The surrounding-region terminal search unit 21 is configured to search for a terminal that is present in the surrounding region of the vehicle. The rescue request transmission unit 22 is configured to transmit a rescue request to the terminal. The first request-addressee information acquisition unit 23 is configured to acquire information identifying the request addressee from the terminal of the request addressee that accepts the rescue request. The digital key providing unit 26 is configured to give a door-unlock authority to the terminal of the request addressee after the first request-addressee information acquisition unit 23 acquires the information. The in-vehicle apparatus 30 includes the one or more processors 70 and the one or more memories 90. The one or more memories 90 are configured to be communicably coupled to the one or more processors 70. The one or more processors 70 are configured to acquire the biometric information regarding the request addressee in a case where the request addressee uses the door-unlock authority and unlocks the door of the vehicle.

In addition, the one or more processors 70 may record, in the one or more memories 90, image information during a rescue operation from a start timing of a rescue to an end timing of the rescue, and may lock the door of the vehicle in a case where the one or more processors 70 determine that the rescue is completed on the basis of the image information.

As a result, it is possible to achieve a swift rescue operation while securing security even in a case where few people are present in the surrounding region of the vehicle to be rescued and it is difficult to draw attention to an alarm from the vehicle to be rescued, or in a case where the owner of the vehicle to be rescued or a person in a store in charge of a place where the vehicle to be rescued is parked does not recognize an emergency report from the vehicle.

In a case of making a rescue request upon an emergency, it may be difficult to find a surrounding-region terminal 40 of a third party or to find a request addressee that accepts the rescue request. In such cases, it is possible to expand the target to be searched for the surrounding-region terminal 40 of the third party to make an emergency rescue request by appropriately selecting, in accordance with the situation, the database that stores information regarding the terminals to which the rescue request is to be transmitted.

This makes it easier for the recue request to be accepted.

In addition, on a condition that the surrounding-region terminal 40 owned by the request addressee has reached the location that is near the position of the vehicle to be rescued and is at the predetermined distance to the position of the vehicle, the digital key providing unit 26 may give the door-unlock authority to the surrounding-region terminal 40 owned by the request addressee.

This makes it possible to secure enhanced security.

The one or more processors 70 may acquire fingerprint information regarding the request addressee as the biometric information when the request addressee opens the door of the vehicle.

Even if there is a damage such as a loss by a theft, this makes it easier to identify the person who has caused the damage from the acquired biometric information regarding the third party.

Modifications

A description is given below of modifications that are different from the example embodiment described above. For example, in a case where the vehicle emergency rescue request system 10 detects that a person is left inside the vehicle, the vehicle emergency rescue request system 10 may output an alarm sound from a device such as an alarming device provided to the vehicle to be rescued and thereby seek for a rescue with respect to a person around the vehicle before making a rescue request regarding the person left inside the vehicle to the surrounding-region terminal 40 owned by a third party.

If no rescue is performed although the alarm sound has been outputted, the vehicle emergency rescue request system 10 may detect whether the temperature inside the vehicle has increased to a temperature that can put the person left inside the vehicle in a dangerous state. If such an increase in the temperature inside the vehicle is detected, for example, the vehicle emergency rescue request system 10 may report the emergency regarding the person left inside the vehicle to a mobile terminal of the owner of the vehicle to be rescued, a store in charge of a place where the owner of the vehicle to be rescued has parked the vehicle, or any other contact.

Making a rescue request step by step in accordance with the emergency level as described above makes it possible to suppress making an excessive rescue request, leading to a swifter rescue. Accordingly, an increase is expectable in a success rate of the life-saving operation.

In addition, upon making a rescue request to the surrounding-region terminal 40 owned by a third party, for example, the rescue request process apparatus 20 may also report an emergency to an outside institution such as a preregistered insurance company for making a rescue request. This makes it expectable that the life-saving operation is secured by the increased number of ways.

In one example, instead of directly making a rescue request to the surrounding-region terminals 40 from the rescue request transmission unit 22 of the rescue request process apparatus 20, the rescue request may be sequentially transferred from one surrounding-region terminal 40 to another nearby surrounding-region terminal 40 by multi-hop communication in a bucket-brigade manner among related identified people such as customers of the same mobile phone service company.

This method makes it possible for the surrounding-region terminal 40 to make a rescue request while performing detection of another surrounding-region terminal 40. As a result, it is possible to efficiently make the rescue request.

Although some example embodiments of the disclosure have been described in the foregoing with reference to the accompanying drawings, the disclosure is by no means limited to configurations of the example embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, the example embodiment described above refers to the configuration in which the in-vehicle apparatus 30 includes the one or more memories 90, the captured-image information recording unit 80, and the door-lock signal transmission unit 75. In one example, however, the rescue request process apparatus 20 may include the one or more memories 90, the captured-image information recording unit 80, and the door-lock signal transmission unit 75.

Each of the surrounding-region terminal search unit 21, the rescue request transmission unit 22, the first request-addressee information acquisition unit 23, the position information transmission unit 24, the terminal approach determination unit 25, the digital key providing unit 26, the rescue completion determination unit 27, the position information acquisition unit 60, the one or more processors 70, the detection unit 71, the second request-addressee information acquisition unit 72, the captured-image information transmission unit 74, the door-lock signal transmission unit 75, and the captured-image information recording unit 80 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the surrounding-region terminal search unit 21, the rescue request transmission unit 22, the first request-addressee information acquisition unit 23, the position information transmission unit 24, the terminal approach determination unit 25, the digital key providing unit 26, the rescue completion determination unit 27, the position information acquisition unit 60, the one or more processors 70, the detection unit 71, the second request-addressee information acquisition unit 72, the captured-image information transmission unit 74, the door-lock signal transmission unit 75, and the captured-image information recording unit 80 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the surrounding-region terminal search unit 21, the rescue request transmission unit 22, the first request-addressee information acquisition unit 23, the position information transmission unit 24, the terminal approach determination unit 25, the digital key providing unit 26, the rescue completion determination unit 27, the position information acquisition unit 60, the one or more processors 70, the detection unit 71, the second request-addressee information acquisition unit 72, the captured-image information transmission unit 74, the door-lock signal transmission unit 75, and the captured-image information recording unit 80 illustrated in FIG. 2.

The invention claimed is:

1. A vehicle emergency rescue request system configured to make a rescue request to an outside of a vehicle in a case where an occupant of the vehicle is in a dangerous state, the vehicle emergency rescue request system comprising:

a rescue request process apparatus; and
an in-vehicle apparatus,
the rescue request process apparatus comprising
    a surrounding-region terminal search unit configured to search for a terminal that is present in a surrounding region of the vehicle,
    a rescue request transmission unit configured to transmit a rescue request to the terminal,
    a first request-addressee information acquisition unit configured to acquire information from the terminal, the information identifying a request addressee who has the terminal on and accepts the rescue request, and
    a digital key providing unit configured to give a door-unlock authority to the terminal of the request addressee after the first request-addressee information acquisition unit acquires the information,
the in-vehicle apparatus comprising
    one or more processors, and
    one or more memories configured to be communicably coupled to the one or more processors, wherein
the one or more processors are configured to acquire biometric information regarding the request addressee in a case where the request addressee uses the door-unlock authority and unlocks a door of the vehicle.

2. The vehicle emergency rescue request system according to claim 1, wherein
the one or more processors are configured to
    record, in the one or more memories, image information from a start timing of a rescue of the occupant to an end timing of the rescue, and
    lock the door of the vehicle in a case where the one or more processors determine that the rescue is completed on a basis of the image information.

3. The vehicle emergency rescue request system according to claim 1, wherein the digital key providing unit is configured to give the door-unlock authority to the terminal of the request addressee in a case where the request addressee reaches a location that is near a position of the vehicle and is at a predetermined distance to the position of the vehicle.

4. The vehicle emergency rescue request system according to claim 1, wherein the one or more processors are configured to acquire fingerprint information of the request addressee as the biometric information when the request addressee opens the door of the vehicle.

5. A vehicle emergency rescue request system configured to make a rescue request to an outside of a vehicle in a case where an occupant of the vehicle is in a dangerous state, the vehicle emergency rescue request system comprising:
a rescue request process apparatus; and
an in-vehicle apparatus,
the rescue request process apparatus comprising circuitry configured to
    search for a terminal that is present in a surrounding region of the vehicle,
    transmit a rescue request to the terminal,
    acquire information from the terminal, the information identifying a request addressee who has the terminal on and accepts the rescue request, and
    give a door-unlock authority to the terminal of the request addressee after acquiring the information,
the in-vehicle apparatus comprising
    one or more processors, and
    one or more memories configured to be communicably coupled to the one or more processors, wherein
the one or more processors are configured to acquire biometric information regarding the request addressee in a case where the request addressee uses the door-unlock authority and unlocks a door of the vehicle.

\* \* \* \* \*